United States Patent
Jang et al.

(10) Patent No.: US 12,319,223 B2
(45) Date of Patent: Jun. 3, 2025

(54) DRIVER SEAT AIRBAG DEVICE FOR VEHICLE AND METHOD FOR MANUFACTURING SAME

(71) Applicant: AUTOLIV DEVELOPMENT AB, Vargarda (SE)

(72) Inventors: Dong Hyun Jang, Hwaseong-si (KR); Yune Jae Shin, Hwaseong-si (KR); Youn Bock Lee, Hwaseong-si (KR); Seung Jin Lee, Hwaseong-si (KR); Dong Young Kim, Hwaseong-si (KR); Hyeon Gyo Park, Hwaseong-si (KR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/756,312

(22) PCT Filed: Nov. 12, 2020

(86) PCT No.: PCT/KR2020/015847
§ 371 (c)(1),
(2) Date: May 21, 2022

(87) PCT Pub. No.: WO2021/101166
PCT Pub. Date: May 27, 2021

(65) Prior Publication Data
US 2023/0011886 A1     Jan. 12, 2023

(30) Foreign Application Priority Data

Nov. 22, 2019   (KR) .................... 10-2019-0151680
Dec. 2, 2019    (KR) .................... 10-2019-0158324
Jul. 16, 2020   (KR) .................... 10-2020-0088505

(51) Int. Cl.
*B60R 21/2346*     (2011.01)
*B60R 21/203*      (2006.01)
(Continued)

(52) U.S. Cl.
CPC ........ *B60R 21/2346* (2013.01); *B60R 21/203* (2013.01); *B60R 21/2338* (2013.01); *B60R 21/235* (2013.01); *B60R 2021/23538* (2013.01)

(58) Field of Classification Search
CPC .............. B60R 21/203; B60R 21/2338; B60R 21/2346; B60R 21/235; B60R 2021/23382; B60R 2021/23538
See application file for complete search history.

(56) References Cited

U.S. PATENT DOCUMENTS 5,848,805 A * 12/1998 Sogi .................... B60R 21/2346
                                                    280/743.2
6,059,312 A *  5/2000 Staub .................. B60R 21/2338
                                                    280/743.1
(Continued)

FOREIGN PATENT DOCUMENTS

DE    102013015223 A1 *  3/2015  ........... B60R 21/203
JP       2002019568 A  *  1/2002  ........... B60R 21/231
(Continued)

*Primary Examiner* — Laura Freedman
(74) *Attorney, Agent, or Firm* — Matthew D. Thayne; Thayne and Davis LLC (57) ABSTRACT

A driver seat airbag device and a method for manufacturing same, the device comprising: a driver seat airbag mounted in a folded state inside a steering wheel; and an inflator connected to the driver seat airbag to supply gas to allow the driver seat airbag to expand between the steering wheel and a driver at the time of a vehicle collision, wherein: the driver seat airbag has a plurality of tether members and a diffuser installed thereat, the tether members restricting an expansion thickness of the driver seat airbag, the diffuser controlling a supply direction for a gas supplied to the driver seat airbag, the tether members and the diffuser being installed between a front panel facing the front side of the vehicle and a rear
(Continued)

panel opposite to the front panel and facing the driver; and the diffuser is installed between the plurality of tether members.

21 Claims, 10 Drawing Sheets

(51) Int. Cl.
*B60R 21/2338* (2011.01)
*B60R 21/235* (2006.01)

(56) References Cited

U.S. PATENT DOCUMENTS

| | | | | |
|---|---|---|---|---|
| 6,086,092 | A * | 7/2000 | Hill | B60R 21/233 280/743.2 |
| 6,598,903 | B2 * | 7/2003 | Okada | B60R 21/2338 280/740 |
| 6,676,158 | B2 * | 1/2004 | Ishikawa | B60R 21/2346 280/743.1 |
| 6,834,884 | B2 * | 12/2004 | Gu | B60R 21/2346 280/743.1 |
| 6,929,285 | B2 * | 8/2005 | Yamada | B60R 21/233 280/743.2 |
| 7,334,812 | B2 * | 2/2008 | Abe | B60R 21/233 280/743.1 |
| 7,708,305 | B2 * | 5/2010 | Ishiguro | B60R 21/2338 280/743.2 |
| 7,976,063 | B2 * | 7/2011 | Abe | B60R 21/2338 280/743.1 |
| 8,840,139 | B1 * | 9/2014 | Borton | B60R 21/2346 280/740 |
| 9,027,956 | B2 * | 5/2015 | Yamaji | B60R 21/203 280/743.1 |
| 9,650,012 | B2 * | 5/2017 | Ishiguro | B60R 21/2338 |
| 9,925,948 | B2 * | 3/2018 | Hotta | B60R 21/235 |
| 10,507,785 | B2 * | 12/2019 | Ishiguro | B60R 21/2338 |
| 10,654,440 | B2 * | 5/2020 | Hotta | B60R 21/2338 |
| 10,919,483 | B2 * | 2/2021 | Hotta | B60R 21/216 |
| 11,097,683 | B2 * | 8/2021 | Ishii | B60R 21/2338 |
| 11,180,103 | B2 * | 11/2021 | Hess | B60R 21/2346 |
| 11,235,731 | B2 * | 2/2022 | Morita | B60R 21/217 |
| 2006/0197320 | A1 * | 9/2006 | Abe | B60R 21/233 280/729 |
| 2015/0137489 | A1 | 5/2015 | Vinton | |

FOREIGN PATENT DOCUMENTS

| | | | |
|---|---|---|---|
| JP | 2007320500 A | * 12/2007 | |
| JP | 2007331658 A | * 12/2007 | ........... B60R 21/233 |
| JP | 2011-126307 A | 6/2011 | |
| JP | 2011-213301 A | 10/2011 | |
| KR | 10-2019-0110363 A | 9/2019 | |
| WO | 2019-069796 A1 | 4/2019 | |

* cited by examiner

FIG. 1

PRIOR ART

FIG. 2

PRIOR ART

FIG. 3

PRIOR ART

DRIVER SEAT AIRBAG DEVICE FOR VEHICLE AND METHOD FOR MANUFACTURING SAME

TECHNICAL FIELD

The disclosure relates to a driver seat airbag device for a vehicle, and more particularly, to a driver seat airbag device for a vehicle which protects a driver by inflating and deploying an airbag cushion upon vehicle collision, and a method for manufacturing the same.

BACKGROUND ART

In general, an airbag module of a vehicle is a safety device that protects an occupant by injecting a gas into an airbag according to a signal of an impact detection sensor upon vehicle collision, and rapidly inflating the airbag.

Such an airbag device is installed in a steering wheel, a dashboard, a seat, a sidewall, etc. provided in a vehicle, and protects an occupant by being inflated toward a front side or a side of the occupant upon vehicle collision.

That is, a vehicle may be provided with a driver air-bag (DAB) and a passenger air-bag (PAB) for protecting occupants on front seats upon frontal collision, a side air-bag (SAB) for protecting a side of an occupant upon broadside collision, a curtain air-bag (CAB), a near air-bag for protecting occupant's knees, etc.

Among these, the driver air-bag is concentrically mounted in a steering wheel, and is configured to be inflated rapidly in response to abrupt deceleration of the vehicle.

For example, the present applicant filed many applications for patent, disclosing a driver seat airbag configuration for a vehicle, as in patent document 1 and patent document 2 presented below.

A related-art early driver seat airbag may be inflated in a substantially ball-like shape when the airbag is inflated, and a lower portion of the airbag does not completely cover a lower portion of a steering wheel, and thus there is a problem that driver's chest is bumped on the steering wheel and is injured.

To solve this problem, the related-art airbag may have a tether member additionally installed therein, and may have a configuration to cover an inflation thickness of a center of the airbag and to completely cover the lower portion of the steering wheel.

According to a condition of a driver sitting on a driver seat, for example, various body sizes, weights, sitting positions, or a collision scenario of the vehicle, a distance between the inflated airbag and the driver or driver's behavior may vary, and in this case, the airbag may not carry out a desired protection function. Accordingly, there is a need for researches on an airbag that can appropriately respond according to various driver conditions and collision modes.

In particular, a compressed folding type which compresses and folds an airbag cushion is recently applied to minimize an installation space of the airbag cushion.

The compressed folding type may minimize a volume by compressing the airbag cushion to have a predetermined direction.

In the airbag cushion to which the compressed folding type is applied, a diffuser for adjusting a supply direction and a speed of gas is installed in order to effectively control a deployment speed and a deployment shape when the airbag cushion is inflated and deployed.

The diffuser applied to the related-art driver seat airbag device for the vehicle may be attached to a rear panel by sewing, and may be divided into an 'X' type, a 'Y' type, or an 'I' type according to a shape of the diffuser, but basically may have a function of restricting a gas flow of the driver seat airbag.

However, as the related-art driver seat airbag device for the vehicle has the diffuser attached to the rear panel by sewing, the structure of the airbag cushion is complicated, and a long working time may be unnecessarily required due to an additional process, such as operations of turning the rear panel inside out, attaching the diffuser, and then, turning the rear panel inside out again, and there is a problem that workability is reduced.

In particular, when the airbag cushion is folded in the compressed folding type described above, the airbag cushion, the tether, and the diffuser are compressed and are unevenly folded, and accordingly, there is a problem that it is difficult to effectively control the flow of the gas.

In addition, the related-art driver seat airbag device for the vehicle may apply a plurality of heat shield sheets in order to prevent damages to the airbag cushion and the diffuser caused by the gas of high temperature and high pressure supplied from an inflater. To this end, there may be problems that the structure of the airbag cushion is complicated, and human, material, time costs required for manufacturing increase.

Accordingly, there is a demand for development of technology which can simplify structures of a tether, a diffuser, and a heat shield sheet installed in a driver seat airbag.

(Patent Document 1) Korean Patent Publication No. 10-2019-0070657 (published on Jun. 21, 2019)

(Patent Document 2) Korean Patent Registration No. 10-1781380 (published on Sep. 25, 2017)

DISCLOSURE OF INVENTION

Technical Problem

The disclosure has been developed in order to solve the above-described problems, and an object of the disclosure is to provide a driver seat airbag device for a vehicle, which can entirely protect head and abdomen with reference to driver's chest, that is, driver's upper body, by inflating and deploying an airbag cushion toward the front of the driver upon vehicle collision, and a method for manufacturing the same.

Another object of the disclosure is to provide a driver seat airbag device for a vehicle, which integrates a tether for restricting deployment shapes of a front panel and a rear panel, and a diffuser for restricting a flow of gas, and can control the flow of the gas by applying the diffuser of the simple structure, and a method for manufacturing the same.

Still another object of the disclosure is to provide a driver seat airbag device for a vehicle, which can effectively control an initial deployment shape and a direction when an airbag cushion, which is folded in a compressed folding type, is inflated and deployed, and a method for manufacturing the same.

Solution to Problem

To achieve the above-described objects, a driver seat airbag device for a vehicle according to the disclosure may include a driver seat airbag mounted inside a steering wheel in a folded state, and an inflater connected to the driver seat airbag to supply a gas to inflate the driver seat airbag between the steering wheel and a driver upon vehicle collision, the driver seat airbag may have a plurality of tether members and a diffuser which are installed between a front panel facing in a forward direction of the vehicle, and a rear panel opposite to the front panel and facing a driver, the plurality of tether members restricting an inflation thickness of the driver seat airbag, the diffuser controlling a supply direction of the gas supplied to the driver seat airbag, and the diffuser may be installed between the plurality of tether members.

In addition, according to the disclosure, a driver seat airbag device for a vehicle may include a driver seat airbag mounted inside a steering wheel in a folded state, and an inflater connected to the driver seat airbag to supply a gas to inflate the driver seat airbag between the steering wheel and a driver upon vehicle collision, and the driver seat airbag may include a tether member to restrict an inflation thickness of the driver seat airbag, and a diffuser installed on the tether member to control an amount of moving and a moving direction of gas by adjusting a movement passage area of the gas supplied to the driver seat airbag.

In addition, according to the disclosure, a method for manufacturing a driver seat airbag device, the method may include: (a) a step of sewing a front panel, a front-facing tether, and a heat shield of a driver seat airbag; (b) a step of sewing a rear panel and a occupant-facing tether; (c) a step of sewing the front-facing tether, the occupant-facing tether, and a diffuser simultaneously; and (d) a step of manufacturing the driver seat airbag by sewing edges of the front panel and the rear panel.

Advantageous Effects of Invention

According to the driver seat airbag device for the vehicle and the method for manufacturing the same according to the disclosure as described above, the diffuser and the tether member which are installed inside the driver seat airbag are integrated, so that there are effects that a backward movement of a gas is restricted and a flow of the gas is controlled.

According to the disclosure, the gas is supplied in the forward direction and the diagonal directions, so that there is an effect that impact applied to driver's chest is minimized.

According to the disclosure, processes of sewing the diffuser between the tether members, and turning back the front panel and the rear panel which are sewed along edges back to the original position with the diffuser and the front panel being spaced apart from each other are performed, so that there is an effect that the front panel and the rear panel are easily turned inside out through a space between the diffuser and the front panel.

Accordingly, according to the disclosure, a level of difficulty in the process of turning the front panel and the rear panel which are sewed along edges back to the original position may be reduced, so that there is an effect that workability is enhanced.

In addition, according to the disclosure, the diffuser and the tether member are integrated so that an installation structure is simplified, and a working time for manufacturing is minimized, and a manufacturing cost is saved by enhancing workability.

In particular, according to the disclosure, the diffuser of a conical shape is applied, so that there is an effect that a deployment shape of the driver seat airbag is effectively adjusted by controlling an amount of gas which is restrained from moving backward by the diffuser and a moving direction.

In addition, according to the disclosure, there is an effect that an amount of moving and a moving direction of gas are controlled by changing a position of a vertex and a size of a central angle of the diffuser, and the shape of the diffuser such as shapes of the body portion and respective protrusions.

Accordingly, according to the disclosure, there is an effect that a driver is safely protected by minimizing impact applied to driver's chest when the driver seat airbag is inflated and deployed.

BEST MODE FOR CARRYING OUT THE INVENTION

Hereinafter, a driver seat airbag device for a vehicle according to preferred embodiments of the disclosure will be described in detail with reference to the accompanying drawings.

In the drawings, a direction facing a steering wheel 11 with reference to a driver in a vehicle is referred to as a 'forward direction (F)' and a direction facing a driver seat is referred to as a 'backward direction (B).'

In addition, terms indicating directions such as 'left side (L),' 'right side (R),' 'upward direction (U),' and 'downward direction (D)' are defined to indicate respective directions with reference to the forward direction and the backward direction described above.

Prior to explaining a configuration of the driver seat airbag device for the vehicle according to preferred embodiments of the disclosure, a configuration of a driver seat airbag device according to related-art technology will be schematically explained with reference to FIGS. 1 to 3.

Figure 1:
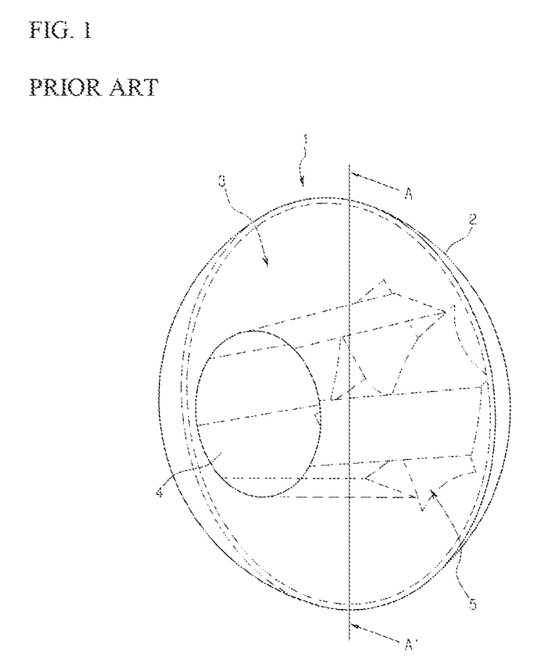
FIG. 1 is a perspective view of a driver seat airbag device for a vehicle according to related-art technology.
Figure 2:
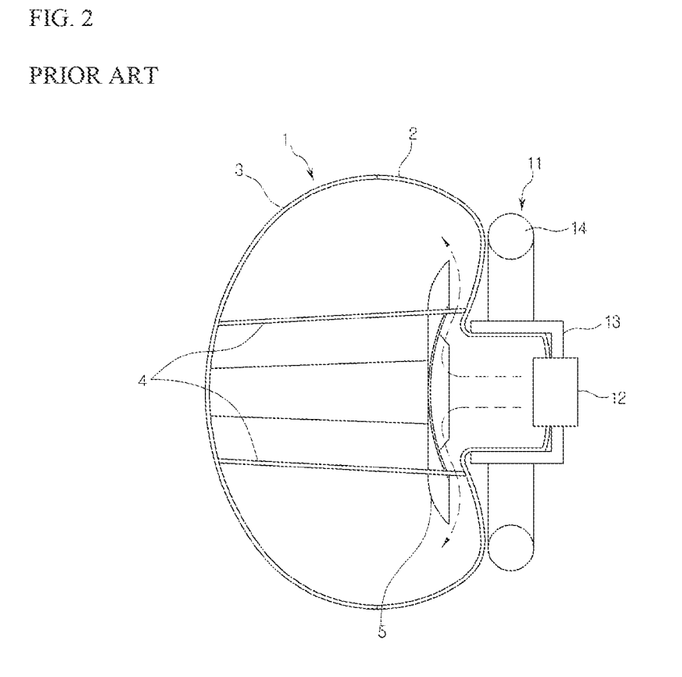
FIG. 2 is a cross-sectional view taken on line A-A' of FIG. 1.
Figure 3:
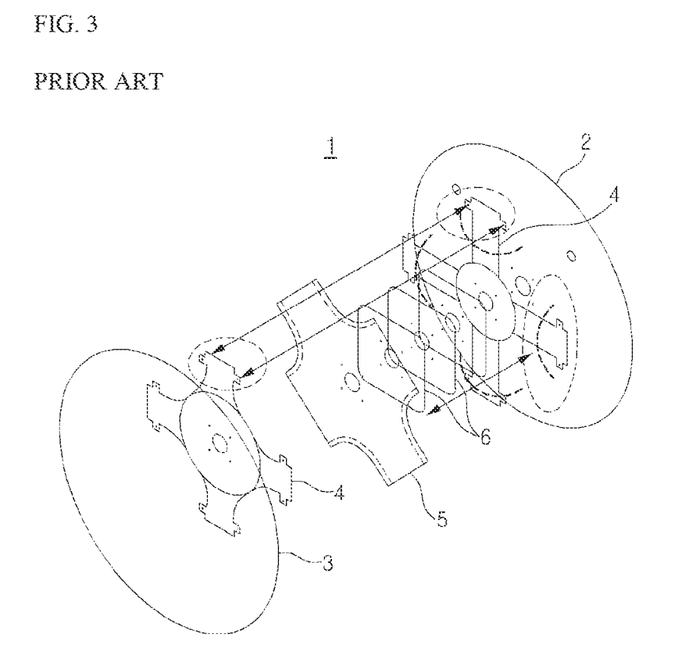
FIG. 3 is an exploded perspective view of a driver seat airbag shown in FIG. 1.

FIG. 1 is a perspective view of a driver seat airbag device according to related-art technology, FIG. 2 is a cross-sectional view taken on line A-A' of FIG. 1, and FIG. 3 is an exploded perspective view of a driver seat airbag shown in FIG. 1.

As shown in FIGS. 1 and 2, the driver seat airbag device 1 for a vehicle according to related-art technology has a tether member 4 installed between a front panel 2 and a rear panel 3, which form a driver seat airbag, to restrict an inflation thickness of the driver seat airbag.

Typically, a plurality of tether members 4, for example, four tether members, are provided as shown in FIG. 1, and a diffuser 5 is installed on a rear surface of the front panel 2 to control a supply direction of a gas supplied from an inflator 12.

The diffuser 5 is formed in a substantially 'X' shape in order to avoid interference with the four tether members 4, and is fixed to the rear surface of the front panel 2 by sewing.

As described above, the diffuser 5 applied to the driver seat airbag device 1 according to related-art technology should be manufactured by using a separate member, and should be sewed while avoiding interference with the tether 4.

In particular, as shown in FIG. 3, the driver seat airbag device 1 according to related-art technology is manufactured by sewing the front panel 2, a front-facing tether 4, a heat shield 6, and the diffuser 5, sewing the rear panel 3 and an occupant-facing tether 4, sewing the front-facing tether 4 and the occupant-facing tether 4, and then, sewing edges of the front panel 2 and the rear panel 3 with the front and rear panels 2, 3 being turned inside out, and turning back to the original position.

However, the process of turning the front panel 2 and the rear panel 3 inside out with the front-facing tether 4 and the occupant-facing tether 4 being sewed, sewing the edges of the front panel and the rear panel, and then turning back to the original position should be performed through a narrow space between the diffuser and the front panel with the diffuser 5 for passing a gas being installed, and accordingly, a working process is complicated and is difficult to perform.

Accordingly, the driver seat airbag device according to related-art technology has problems that a manufacturing process and a structure are complicated, and a level of difficulty in a manufacturing process is high and thus an unskilled worker has difficulty in performing, and a working time is unnecessary delayed, and human, material, and time costs increase.

The driver seat airbag device 1 for the vehicle according to related-art technology further includes a plurality of heat shield sheets 6 installed around a supply hole through which a gas is supplied from the inflator 12 to the front panel 2, in order to prevent a damage to the driver seat airbag caused by a gas of high temperature supplied from the inflator 12.

As described above, since a process of installing the plurality of heat shield sheets on the front panel 2 is added, the driver seat airbag device 1 for the vehicle according to related-art technology has problems that workability is reduced and human, material, and time costs required for manufacturing increase.

To solve these problems, a driver seat airbag device and a method for a manufacturing the same according to the disclosure provide a simple structure by integrating a tether member for restricting a deployment shape of an airbag and a diffuser for controlling a supply direction of a gas, and enhance workability by reducing a level of difficulty in a manufacturing process, and save a manufacturing cost.

In addition, the disclosure has a diffuser formed in a substantially conical shape, and effectively controls a flow of a gas by adjusting a surface area ratio of the diffuser.

First Embodiment

Next, a configuration of a driver seat airbag device according to a first embodiment of the disclosure will be described in detail with reference to FIGS. 4 and 5.

Figure 4:
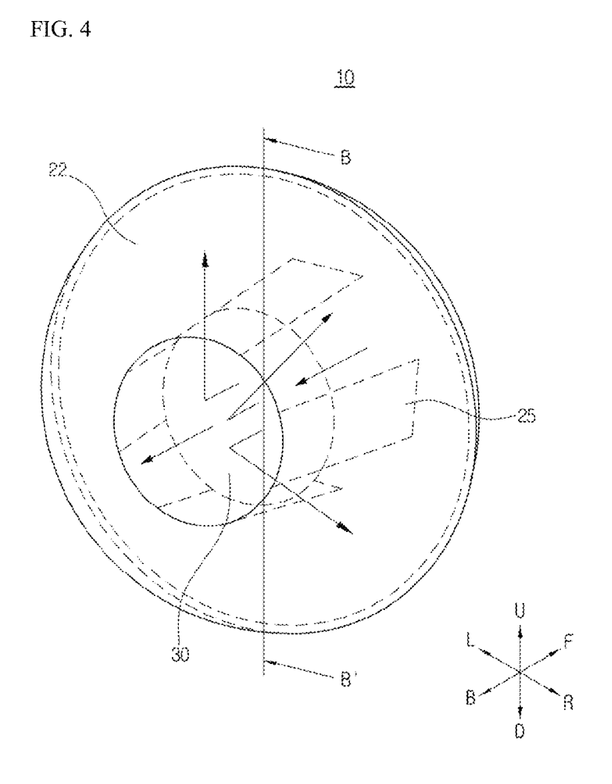
FIG. 4 is a perspective view illustrating an inflation state of a driver seat airbag of a driver seat airbag device for a vehicle according to a first embodiment of the disclosure.
Figure 5:
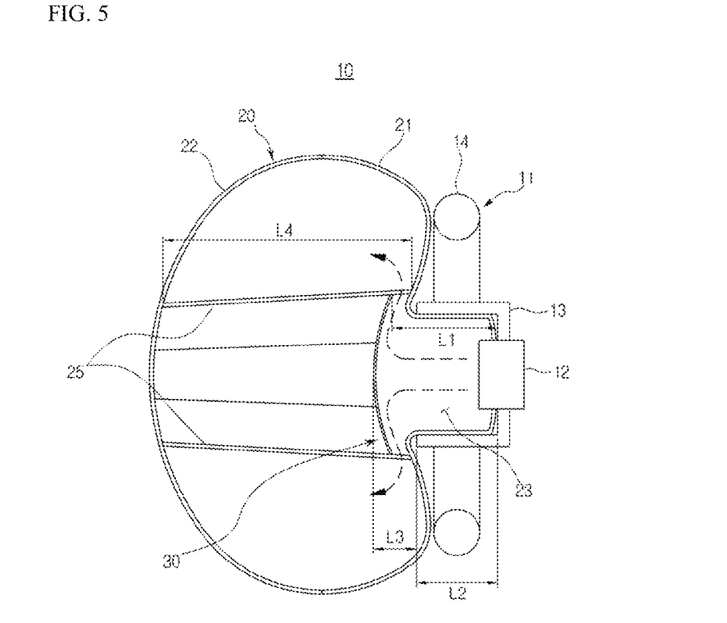
FIG. 5 is a cross-sectional view taken on line B-B' of FIG. 4.

FIG. 4 is a perspective view illustrating an inflation state of a driver seat airbag of the driver seat airbag device according to the first embodiment of the disclosure, and FIG. 5 is a cross-sectional view taken on line B-B' of FIG. 4.

Hereinafter, an airbag configuration folded in a compressed folding type to minimize a volume of an airbag 20 installed in a housing 13 of a steering wheel 11 will be described.

Of course, the disclosure is not limited thereto, and it should be noted that the disclosure is applied to an airbag installed by being folded or rolled in various methods.

The airbag device 10 for a vehicle according to the first embodiment of the disclosure is mounted in the steering wheel 11 provided on a driver seat of the vehicle as shown in FIGS. 3 and 4.

That is, the driver seat airbag device 10 includes a driver seat airbag (hereinafter, referred to as an 'airbag') 10 mounted in the housing 13 within the steering wheel 11 in a folded state, and an inflator 12 connected to the airbag 20 to supply a gas to inflate the airbag 20 between the steering wheel 11 and a driver.

The airbag 20 may be formed in a bag-like shape by sewing a front panel 21 facing the front side of the vehicle when the airbag is inflated, and a rear panel 22 opposite to the front panel 21 and facing the driver, or by one piece woven method.

A supply hole 23 is formed on the front panel 21 to supply a gas from the inflator 12, and one or more heat sealing sheets (not shown) may be connected to the periphery of the supply hole 23 in order to endure the gas of high temperature and high pressure generated from the inflator 12.

In addition, a vent hole (not shown) may be formed on the front panel 21 to discharge the gas in the airbag 20 to the outside after the airbag 20 is deployed.

A tether member 25 may be installed between the front panel 21 and the rear panel 22 to substantially neighbor a center of the airbag 20 to restrict an inflation thickness of the airbag 20.

The tether member 25 may function to prevent a center portion of the airbag 20 from protruding toward the driver due to the gas supplied to the front panel 21 and the rear panel 22 from the inflator 12, and to restrict a deployment shape of the airbag 20 to completely cover a rim portion 14 of the steering wheel 11.

A length of an upper end of the tether member 25 which follows a forward and backward direction of the vehicle may be longer than a length of a lower end of the tether member 25, such that an upper portion of the airbag 20 is inflated thicker than a lower portion.

A plurality of tether members 25, for example, two to four tether members, may be provided, and front ends and rear ends of the respective tether members 25 may be coupled to the front panel 21 and the rear panel 22, respectively, by sewing.

Herein, each tether member 25 is manufactured with two separate pieces, and the two separate pieces of the tether member 25 are connected inside the airbag 20 by sewing.

A diffuser 30 is installed between the front panel 21 and the rear panel 22 to control a supply direction of the gas supplied through the supply hole 23.

The diffuser 30 may be manufactured in the form of a substantially circular membrane by using fabric of the same or similar material as or to that of the airbag 20, and may be installed on the tether member 25.

For example, when four tether members 25 are installed on an upper side, a lower side, and both sides of the periphery of the supply hole 23 as shown in FIGS. 4 and 5, an upper end, a lower end, and both ends of the diffuser 30 may be fixed to the four tether members 25, respectively.

Herein, the diffuser 30 may be fixed to the respective tether members 25 by sewing.

In the present embodiment, the diffuser 30 may be fixed by being sewed with each tether member 25 when a sewing operation for connecting two separate pieces of each tether member 25 with each other is performed.

As described above, the diffuser is sewed when the sewing operation for connecting the two separate pieces of each tether member is performed to manufacture a normal driver seat airbag, and the diffuser may be disposed substantially on the center portion of the tether member.

Accordingly, since an operation of fixing the diffuser to the front panel of the driver seat airbag is not required to be additionally performed in the disclosure, the structure of the driver seat airbag device can simplified and workability can be enhanced.

The gas supplied from the inflater 12 may be restrained from moving backward by the diffuser 30, and may be supplied through a space between the respective tether members 25 in a diagonal direction to correspond to a substantially 'X' shape with reference to a center point of the diffuser 30.

That is, in the present embodiment, the diffuser 30 changes a moving direction of the gas to face in the diagonal directions, respectively, with reference to the center point of the diffuser, and a deployment speed and a deployment shape of the airbag 20 may be adjusted by adjusting a speed and an amount of gas supplied between the front panel 21 and the rear panel 22 by adjusting a shape or an installation angle of the diffuser 30.

For example, the diffuser 30 may be formed to have a cross-sectional area that is slightly larger than a cross-sectional area of the space between the respective tether members 25 or is the same as the cross-sectional area of the space.

If the diffuser 30 is formed to have a cross-sectional area smaller than the cross-sectional area of the space between the respective tether members 25, the respective tether members 25 are not completely inflated due to the diffuser 30 fixed substantially to a center portion thereof, and accordingly, a deployment shape of the airbag 20 may be ununiform or incomplete.

On the other hand, if the diffuser 30 is formed to have a cross-sectional area slightly larger than the cross-sectional area of the space between the respective tether members 25, a center portion of the diffuser 30 is inflated in an arc shape, which is convex toward the rear side when viewed from a side surface, due to the pressure of gas, compared to upper and lower ends and both ends sewed with the respective tether members 25 when the airbag 20 is inflated.

Accordingly, the gas supplied from the inflater 12 through the supply hole 23 may be restrained from moving backward by the diffuser 30, and may be refracted forward with reference to the center point of the diffuser 30 and may be supplied in the diagonal directions.

In addition, if the diffuser is formed to have the same cross-sectional area as the cross-sectional area of the space between the respective tether members 25, the diffuser may be inflated in a substantially planar shape when the airbag 20 is inflated since the upper and lower ends and the both ends of the diffuser are sewed with the tether members 25.

Accordingly, the gas supplied from the inflater 12 through the supply hole 23 may be restrained from moving backward by the diffuser 30, and may be refracted forward with reference to the center point of the diffuser 30 and may be supplied in the diagonal directions.

With this, the diffuser 30 may be disposed to be deployed at a rear side behind a rear end of the housing 13 in which the airbag 20 is accommodated when the airbag 20 is inflated, as viewed in FIG. 5.

That is, it is preferable that a distance L1 between the diffuser 30 and a front end of the housing 13 is longer than a distance L2 between the front end and the rear end of the housing 13.

In addition, the diffuser 30 may be disposed to be deployed at a front side ahead the middle portion of the tether member 25, so as to achieve an effect of preventing a backward movement of a gas.

That is, it is preferable that a distance L3 between the diffuser 30 and a front end of the airbag 20 is shorter than ½ of a tether length L4.

As described above, when the driver seat airbag is inflated and deployed, the disclosure restricts a backward movement of a gas by using the diffuser integrated with the tether members, and supplies the gas in the forward direction and the diagonal directions, thereby minimizing an impact applied to driver's chest.

In addition, the disclosure simplifies an installation structure by integrating the diffuser and the tether members, minimizes a working time during manufacturing, and saves a manufacturing cost by enhancing workability.

Next, a method for manufacturing the driver seat airbag device according to the first embodiment of the disclosure will be described in detail with reference to FIGS. 6 and 7.

Figure 6:
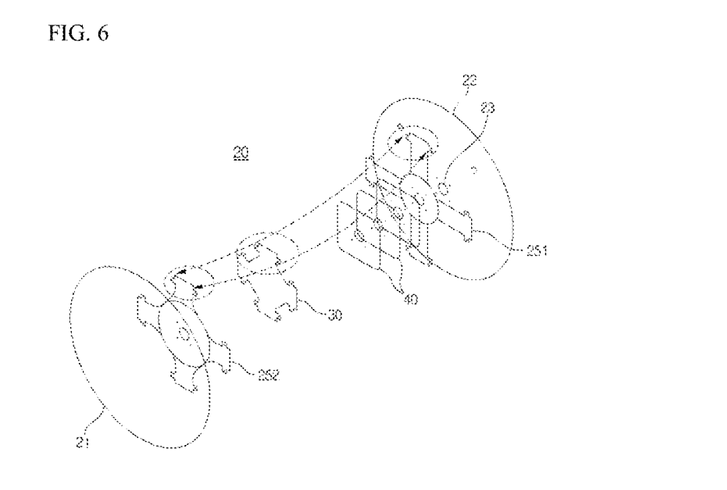
FIG. 6 is a process diagram explaining respective steps of a method for manufacturing the driver seat airbag device according to the first embodiment of the disclosure.
Figure 7:
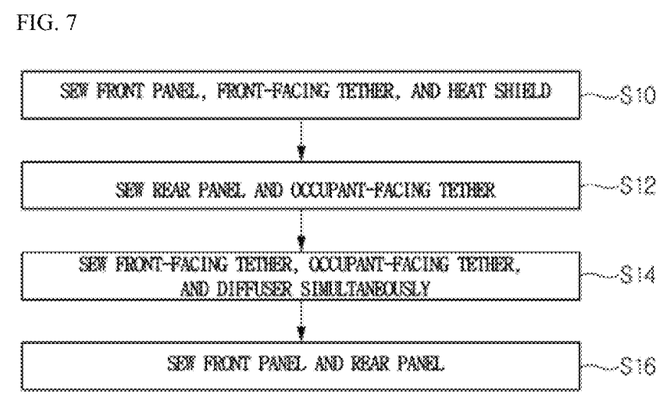
FIG. 7 is an exploded perspective view explaining the method for manufacturing the driver seat airbag device shown in FIG. 6.

FIG. 6 is a process diagram explaining respective steps of a method for manufacturing the driver seat airbag device according to the first embodiment of the disclosure, and FIG. 7 is an exploded perspective view explaining the method for manufacturing the driver seat airbag device shown in FIG. 6.

In the following descriptions, among the tether members which are divided into two pieces, a tether that is sewed with the front panel 21 is referred to as a 'front-facing tether 251', and a tether that is sewed with the rear panel 22 is referred to as a 'occupant-facing tether 252'.

Herein, the front-facing tether 251 and the occupant-facing tether 252 may include center portions sewed with the front panel 21 and the rear panel 22, and a plurality of extension portions extended from the center portions to the outside as viewed in FIG. 7.

For example, the center portion may be formed in a substantially circular shape, and two to four extension portions may be provided outside the center portion.

In the present embodiment, it is illustrated that the tether member has the front-facing tether and the occupant-facing tether having four extension portions, respectively, but the disclosure is not necessarily limited thereto. It should be noted that changes are made to provide two or three extension portions.

As shown in FIG. 6, the method for manufacturing the driver seat airbag device according to the first embodiment of the disclosure includes a step of (a) sewing the front panel of the driver seat airbag, the front-facing tether, and a heat shield, a step of (b) sewing the rear panel and the occupant-facing tether, a step of (c) sewing the front-facing tether and the occupant-facing tether, and the diffuser simultaneously, and a step of (d) manufacturing the driver seat airbag by sewing edges of the front panel and the rear panel.

Specifically, at step S10 of FIG. 6, a worker places a plurality of heat shields 40 and the front-facing tether 251 on a center portion of the rear surface of the front panel 21 in sequence, and then, sews along a sewing line of a substantially circular shape.

The heat shield 40 functions to prevent high-temperature heat generated when the inflater 12 is exploded from being transmitted to peripheral areas, and may be manufactured with a fabric material.

A plurality of heat shields 40, for example, three or more heat shields, may be provided to increase heat blocking efficiency, and transmission holes may be formed on center portions of the respective heat shield 40 and front-facing tether 251 to deliver the gas supplied from the inflater 12 through the front panel 21 toward the diffuser 30.

At step S12, the worker places the occupant-facing tether 252 on a center portion of the front surface of the rear panel 22, and sews along a sewing line of a substantially circular shape.

At step S14, the worker sews simultaneously with the diffuser 30 being disposed between the respective extension portions provided on the front-facing tether 251 and the respective extension portions provided on the occupant-facing tether 252.

For example, the respective extension portions of the front-facing tether 251 may be disposed while being bent toward the rear side and the center, and the diffuser 30 and the extension portions of the occupant-facing tether 252 are disposed to overlap the extension portions of the front-facing tether 251 which are bent.

Accordingly, the worker may connect the front-facing tether 251, the diffuser 30, and the occupant-facing tether 252 by sewing the overlapping portions.

As described above, since the disclosure sews the diffuser at the same time as sewing the tether member which is divided into two pieces, a process of sewing a diffuser with a front panel in related-art technology may be removed, and the number of working processes may be reduced and workability may be enhanced.

On the other hand, the gas supplied from the inflater 12 to the airbag 20 when the airbag 20 is deployed is in a state of high temperature and high pressure.

As described above, since the gas in the state of high temperature and high pressure is instantaneously supplied toward the diffuser 30, sewed portions of the diffuser 30 and the tether member 25 may be torn or damaged.

To solve this problem, portions sewed with each other, that is, at least one of connection portions between the respective extension portions of the front-facing tether 251 and the occupant-facing tether 252, and the diffuser 30, is sewed while being folded one or more times, so that rigidity of the sewed portions is reinforced.

Alternatively, a separate reinforcement member (not shown) formed with a fabric material, etc. may be put over the portions sewed with each other, and the respective tethers 251, 252, the diffuser 30, and the reinforcement member may be sewed simultaneously, so that rigidity of the sewed portions is reinforced.

In addition, the respective tethers 251, 252, the diffuser 30, and the reinforcement member may adhere to one another by bonding, or may be sewed while overlapping one another and being folded one or more times.

At step S16, the driver seat airbag 20 may be manufactured by turning the front panel 21 and the rear panel 22 inside out and in this state sewing edges, and then, turning back to the original position.

According to the disclosure as described above, the diffuser is sewed between the tether members, and a process of turning the front panel and the rear panel sewed along edges back to the original position is performed with the diffuser and the front panel being spaced apart from each other.

Accordingly, the disclosure can easily turn the front panel and the rear panel inside out through a space between the diffuser and the front panel being spaced apart from each other.

That is, the disclosure may enhance workability by reducing a level of difficulty of the process of turning the front panel and the rear panel sewed along edges back to the original position.

The airbag 20 manufactured through the above-described process is folded by a compressed folding type and is installed inside the housing 13 of the steering wheel 11 along with the inflater 12, and an airbag cover (not shown) is coupled to an opening surface of the housing 13.

When vehicle collision occurs, the inflater 12 may generate a gas by igniting chemicals for generating the gas, which are charged inside, according to a detection signal of a collision sensor (not shown) installed in the vehicle, and the generated gas may be supplied to the inside of the airbag 20 through a supply hole 23 of the front panel 21.

In this case, since the diffuser 30 is fixed substantially to the center portion of each tether member 25, a backward movement of the gas may be restricted, and a supply direction of the gas refracted forward by the diffuser 30 may be changed to face in the diagonal directions with reference to the center point of the diffuser 30.

As a result of testing deployment performance of the driver seat airbag device 10 for the vehicle according to the present embodiment, it can be identified that almost similar deployment performance to that of the driver seat airbag device 1 according to the related-art technology, to which the X-shaped diffuser 5 is applied as shown in FIGS. 1 and 2, is shown.

In the present embodiment, four tether members 25 are disposed at an upper side, a lower side, and both sides with reference to the center point of the airbag 20, respectively, but the disclosure is not limited thereto.

That is, in the disclosure, two to four tether members 25 may be applied, and a space between the respective tether members 25 may be formed in an I or − shape, a Y or inverted Y-shape, an X or + shape, such that a moving direction of the gas which is restrained from moving backward by the diffuser 30, and an amount of gas moving through the space between the respective tether members 25 may be adjusted.

To achieve this, the disclosure may adjust the total number of tether members 25, an installation position and a width of each tether member 25 variously.

For example, when three tether members 25 are applied, the three tether members 25 may be installed at positions spaced apart from one another by about 120° with reference to the center point of the airbag 20, and in this case, a space between the respective tether members 20 may be formed in a substantially Y shape or inverted Y shape.

In addition, the three tether members 25 may be manufactured with a width larger than a width of each tether member in the airbag to which four tether members 25 are applied, and may be installed at larger intervals than an interval between the four tether members.

Of course, the width of the respective tether members and the interval therebetween may be changed to be wide or narrow according to a result of testing a moving direction of the gas when the airbag is deployed.

As described above, the disclosure may adjust a moving direction and a flow of the gas which is restrained from moving backward by the diffuser, by adjusting the number of tether members on which the diffuser is installed, an installation position and a width.

Through the above-described process, the disclosure can integrate the diffuser installed in the driver seat airbag, and the tether members, thereby restricting a backward movement of the gas, and supply the gas through the space between the tether members, thereby minimizing impact applied to driver's chest.

Second Embodiment

Figure 8:
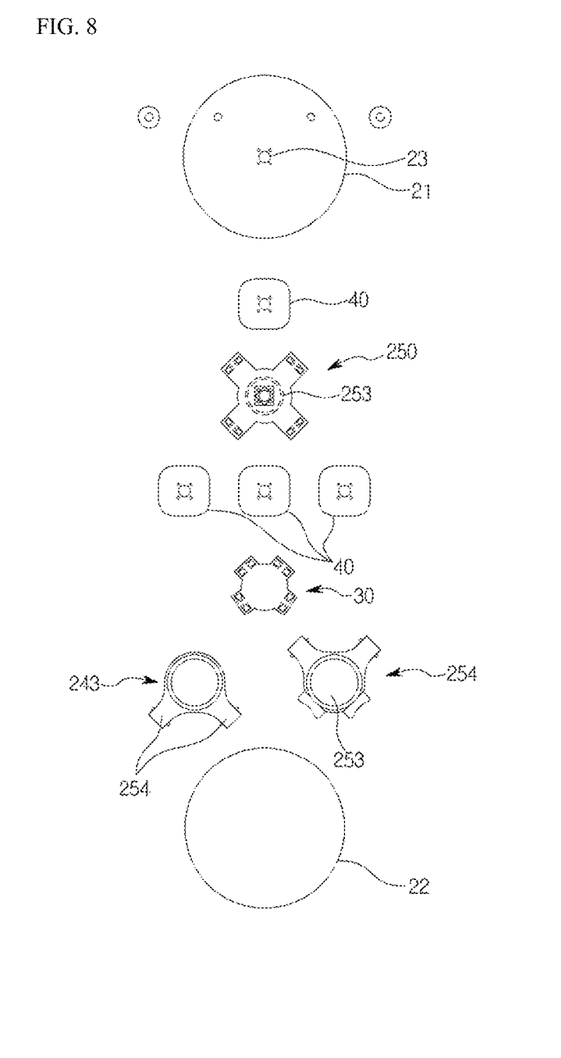
FIG. 8 is a development view of a driver seat airbag and first and second tether members of a driver seat airbag device for a vehicle according to a second embodiment of the disclosure.

FIG. 8 is a development view of a driver seat airbag of a driver seat airbag device for a vehicle, and first and second tether members according to a second embodiment of the disclosure.

As shown in FIG. 8, the driver seat airbag device for the vehicle according to the second embodiment of the disclosure is similar to the configuration of the driver seat airbag device according to the first embodiment described above with reference to FIGS. 4 to 6.

In the present embodiment, the tether member 25 may be formed with two separate pieces as shown in FIG. 8.

Herein, one or more heat shield sheets 40 may be disposed on a front surface and a rear side of the front-facing tether 251, respectively, and one pair of occupant-facing tethers 252 may be provided to have center portions 253 overlapping each other.

As shown in FIG. 8, the front-facing tether 251 and the occupant-facing tether 252 may include center portions 253 sewed with the front panel 21 and the rear panel 22, respectively, and a plurality of extension portions 254 extended from the center portions 253 to the outside and connected with the diffuser 30 by sewing.

For example, each center portion 253 may be formed in a substantially circular shape, and two to four extension portions 254 may be provided on an outside of the center portion 253.

In the present embodiment, it is illustrated that the tether member 25 has the front-facing tether 251 and the occupant-facing tether 252 having four extension portions 254, respectively, but the disclosure is not necessarily limited thereto. It should be noted that changes are made to provide two, three, or five or more extension portions 254.

Hereinafter, a configuration of the diffuser will be described in detail with reference to FIGS. 9 and 10.

Figure 9:
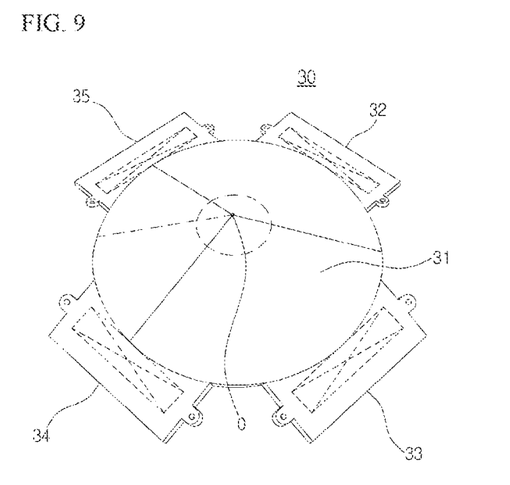
FIG. 9 is an enlarged perspective view of a diffuser shown in FIG. 8.
Figure 10:
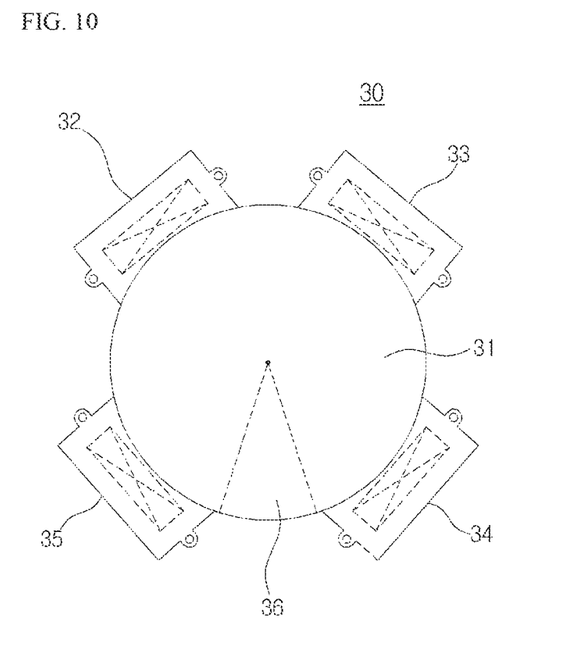
FIG. 10 is a development view of the diffuser shown in FIG. 9.

FIG. 9 is an enlarged perspective view of the diffuser shown in FIG. 8, and FIG. 10 is a development view of the diffuser shown in FIG. 9.

As shown in FIGS. 9 and 10, the diffuser 30 may be formed in a conical shape and a cone shape (hereinafter referred to as 'conical shape') to have its center portion protruding backward.

To achieve this, the diffuser 30 may include a body portion 31 formed on a center portion thereof in a substantially circular shape in cross section, and a plurality of protrusions, for example, first to fourth protrusions 32 to 35, protruding from the body portion 31 to the outside and connected to the tether member 25, respectively, by sewing.

Hereinafter, a protrusion provided on an upper end of the body portion 31 is referred to as a first protrusion 32, and the others are referred to as second to fourth protrusions 33 to 35 in the clockwise direction on FIG. 10

The diffuser 30 may be formed in a substantially conical shape by cutting out a part of the body portion 31 provided in a substantially disk shape and connecting the cut both sides with each other.

To achieve this, the body portion 31 may be provided with a cut-out area 36 having a substantially fanwise shape.

In the present embodiment, the cut-out area 36 may be formed with a central angle $\alpha$ which is set to a predetermined angle with reference to the center (O) of the body portion 31.

For example, the cut-out area 36 may be formed to have a central angle of about 1° to 60° with reference to the center (O) of the body portion 31.

Of course, the disclosure is not limited thereto, and a flow of a gas may be controlled by adjusting a surface area of the inside of the diffuser 30, which is formed in the conical shape, by changing the shape of the cut-out area 36, that is, a position of a vertex P and the central angle $\alpha$ of the cut-out area 36.

Third Embodiment

Figure 11:
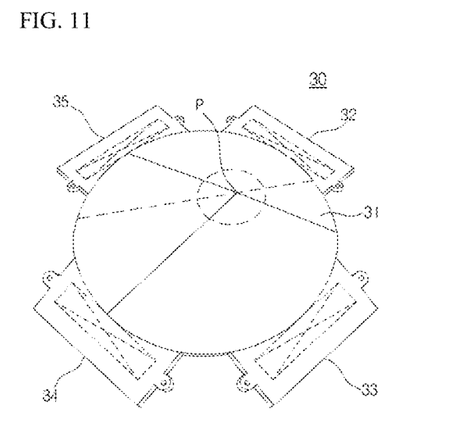
FIG. 11 is a development view of a diffuser applied to a driver seat airbag device for a vehicle according to a third embodiment of the disclosure.
Figure 12:
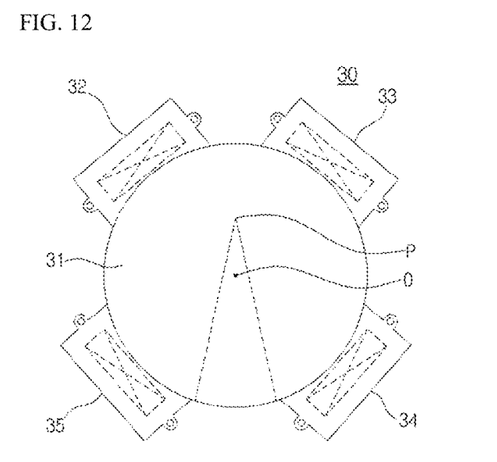
FIG. 12 is a perspective view of the diffuser shown in FIG. 11.

FIG. 11 is a development view of a diffuser applied to a driver seat airbag device for a vehicle according to a third embodiment of the disclosure, and FIG. 12 is a perspective view of the diffuser shown in FIG. 11.

A vertex P of a cut-out area 36 may be disposed at a position shifted from the center O of the body portion 31 toward one side, for example, toward an upper side when viewed in FIG. 12, as shown in FIGS. 11 and 12.

Since the vertex P is disposed higher than the center C of the body portion 31, the diffuser 30 may be formed in a conical shape that is eccentric, such that an upper surface of the diffuser 30 has a higher slope than a lower surface with reference to the vertex P.

As described above, when the vertex position P is shifted to an upper side and the diffuser 30 is formed in the eccentric conical shape, a gas supplied through the supply hole 23 of the front panel 21 may more smoothly move toward the lower side which has a relatively gentler slope than the upper side of the diffuser 30. Accordingly, an amount of gas moving toward the upper side of the diffuser 30 may be smaller than an amount of gas moving toward the lower side.

Of course, the disclosure may control the flow of the gas by shifting the vertex P of the diffuser 30 not only toward the upper side, but also toward the lower side, the left or right with reference to the center O of the body portion 31.

As described above, the disclosure may control an amount of movement and a moving direction of the gas by individually adjusting moving passages of the gas moving through the space between the respective extension portions provided on the front-facing tether of the tether member, by adjusting the position of the vertex of the diffuser.

In addition, the disclosure may control the flow of the gas by reducing or increasing a surface area of the inside of the diffuser formed in the conical shape, by increasing or reducing the central angle of the cut-out area provided on the diffuser.

On the other hand, the disclosure may have the diffuser 30 formed in the conical shape or disk shape, and may control the flow of the gas by changing the shapes of the body 31 and the respective protrusions 32 to 35.

Fourth Embodiment

Figure 13:
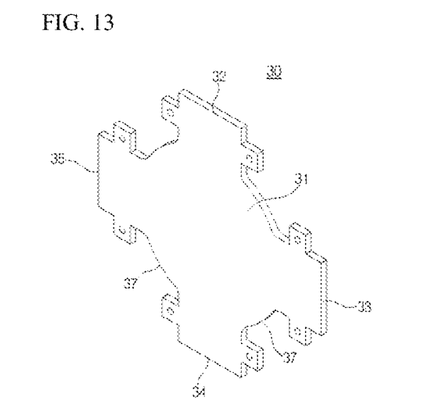
FIGS. 13 and 14 are perspective views of a diffuser applied to a driver seat airbag device for a vehicle according to a fourth embodiment of the disclosure.
Figure 14:
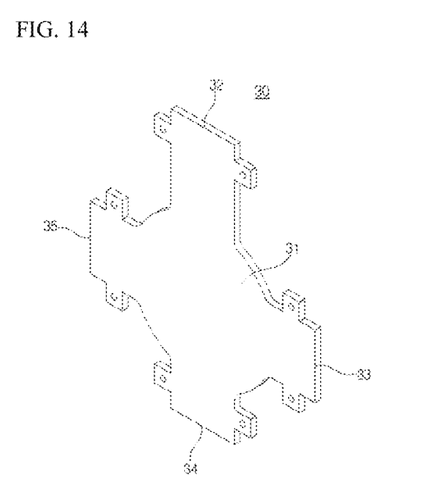

FIGS. 13 and 14 are perspective views of a diffuser applied to a driver seat airbag device for a vehicle according to a fourth embodiment of the disclosure.

In the driver seat airbag device 10 for the vehicle according to the fourth embodiment of the disclosure, the diffuser 30 may control a flow of a gas by changing shapes of the body portion 31 and the respective protrusions 32 to 35, as shown in FIGS. 13 and 14.

That is, each of connection portions 37 provided between the body portion 31 and the respective protrusions 32 to 35 may have a substantially triangular cross-section as shown FIG. 11.

Herein, the oblique side of each connection portion 37 may be changed variously to a linear shape or an arc shape which is convex outward, or an arc shape that is concave inward.

In the disclosure as described above, the connection portions provided between the body portion and the respective protrusions of the diffuser are formed in a linear shape or a convex or concave-arc shape, and accordingly, the disclosure may control an amount of moving gas by reducing or increasing an area of a passage through which the gas moves.

On the other hand, the respective protrusions 32 to 35 are connected with the respective extension portions 254 of the front-facing tether 251 and the occupant-facing tether 252 by sewing, and accordingly, the disclosure may control an amount of moving and a moving direction of gas by increasing or reducing an area of a passage through which the gas moves, by adjusting lengths of the respective protrusions 32 to 35.

For example, when the length of the first protrusion 32 increases, areas of moving passages of the gas formed between the first and second protrusions 32, 33 and between the first and fourth protrusions 32, 35, with the body portion 31, increase, so that an amount of moving gas increases.

On the other hand, when the length of the first protrusion 32 decreases, areas of moving passages of the gas formed between the first and second protrusions 32, 33 and between the first and fourth protrusions 32, 35, with the body portion 31, decrease, so that an amount of moving gas decreases.

As described above, the disclosure may control an amount of gas moving through the moving passage between the respective protrusions by adjusting the moving passage of the gas by adjusting the length of the protrusion provided on the diffuser.

Accordingly, the disclosure may control a moving direction of the gas by adjusting a ratio of an amount of gas moving through the space between the respective protrusions.

INDUSTRIAL APPLICABILITY

The disclosure is applied to technology of a driver seat airbag device for a vehicle, which restricts a backward movement of a gas by using the diffuser integrated with the tether member when the driver seat airbag is inflated and deployed, and minimizes impact applied to driver's chest by supplying the gas in the forward direction and the diagonal directions.

What is claimed is:

1. A driver airbag apparatus of a vehicle, the driver airbag apparatus comprising:
   a driver airbag installed inside a steering wheel in a folded state; and
   an inflator connected to the driver airbag to supply gas so that the driver airbag is configured to expand between the steering wheel and a driver upon vehicle collision,
   wherein the driver airbag is provided therein with a plurality of tether members disposed between a front panel directed forward of the vehicle and a rear panel opposite the front panel, configured to face the driver, and configured to be directed to the driver to limit an expansion thickness of the driver airbag, and a diffuser configured to control a supply direction of the gas supplied to the driver airbag, and
   the diffuser is installed between and directly coupled to the plurality of tether members, wherein the diffuser is spaced apart from and indirectly coupled with the front panel, and wherein the diffuser comprises a plurality of protrusions protruding outward from a body portion of the diffuser.

2. The driver airbag apparatus of claim 1, wherein a number, an installation position and a width of the tether members are adjustable to adjust a flow direction and a flow rate of the gas flowing through a space formed between the tether members.

3. The driver airbag apparatus of claim 2, wherein the space formed between the plurality of tether members has one of I, –, Y, inverse-Y, X and + shapes.

4. The driver airbag apparatus of claim 1, wherein the plurality of tether members are divided into two parts, respectively, and
   the diffuser is fixed to the plurality of tether members in a sewing manner in a state in which the diffuser is arranged on a connection portion of each tether member divided into the two parts.

5. The driver airbag apparatus of claim 1, wherein the diffuser is configured to have a sectional area larger than a sectional area of spaces formed between the plurality of tether members, and
   a backward movement of the gas supplied from the inflator is restricted by the diffuser so that the gas moves through the spaces formed between the plurality of tether members.

6. The driver airbag apparatus of claim 1, wherein
   the diffuser is configured to have a sectional area equal to a sectional area of spaces formed between the plurality of tether members, and
   a backward movement of the gas supplied from the inflator is restricted so that the gas is refracted forward and moves through the spaces formed between the plurality of tether members.

7. The driver airbag apparatus of claim 1, wherein the diffuser is configured to have a sectional area equal to or larger than a sectional area of spaces formed between the plurality of tether members, and
   a backward movement of the gas supplied from the inflator is limited by the diffuser so that the gas is refracted forward and moves through the spaces formed between the plurality of tether members.

8. The driver airbag apparatus of claim 1, wherein the diffuser is arranged such that the diffuser is deployed at a position located rearward of a rear end of a housing where the driver airbag is accommodated, and forward of a middle portion of the tether members.

9. The driver airbag apparatus of claim 1, wherein the plurality of protrusions radially protrude outward from the body portion of the diffuser.

10. The driver airbag apparatus of claim 9, wherein the plurality of protrusions comprises four protrusions radially protruding from the body portion of the diffuser.

11. The driver airbag apparatus of claim 1, wherein the body portion of the diffuser is solid.

12. A driver airbag apparatus of a vehicle, the driver airbag apparatus comprising:
a driver airbag mounted inside a steering wheel in a folded state; and
an inflator connected to the driver airbag to supply gas so that the driver airbag is configured to expand between the steering wheel and a driver upon a vehicle collision, wherein the driver airbag includes:
a tether member that limits an expansion thickness of a chamber of the driver airbag, wherein the tether member comprises a plurality of extension portions extending radially outward from a center portion of the tether member; and
a diffuser which is installed on the tether member and adjusts an area of a moving passage of the gas supplied to the driver airbag to control an amount and a moving direction of the gas, wherein the diffuser is spaced apart from all outer peripheral walls of the driver airbag defining the chamber, and wherein the diffuser comprises a plurality of protrusions protruding outward from a body portion of the diffuser.

13. The driver airbag apparatus of claim 12, wherein the diffuser is configured to swell toward the driver when the driver airbag is deployed, and controls a flow of the gas by adjusting an internal surface area.

14. The driver airbag apparatus of claim 13, wherein the diffuser is provided with an incision region that is cut in a fan shape, and
the diffuser is formed in a conical shape by connecting both sides of the incision region through a sewing method.

15. The driver airbag apparatus of claim 14, wherein the diffuser controls an amount and a moving direction of the gas by adjusting at least one of a position of a vertex and a size of a center angle.

16. The driver airbag apparatus of claim 12, wherein the body portion is formed in a circular shape, and
the protrusions are connected to the tether member by a sewing method.

17. The driver airbag apparatus of claim 16, wherein
an oblique side of a connecting portion is formed in a straight or curved shape to adjust the area of the moving passage of the gas.

18. The driver airbag apparatus of claim 16, wherein the plurality of protrusions are configured to be adjusted in length to adjust the area of the moving passage of the gas.

19. The driver airbag apparatus of claim 12, wherein the diffuser is not directly fixed to a front panel of the driver airbag.

20. The driver airbag apparatus of claim 12, wherein the diffuser is disposed at least substantially on a center portion of the tether member.

21. A driver airbag apparatus of a vehicle, the driver airbag apparatus comprising:
a driver airbag installed inside a steering wheel in a folded state; and
an inflator connected to the driver airbag to supply gas so that the driver airbag is configured to expand between the steering wheel and a driver upon vehicle collision,
wherein the driver airbag is provided therein with a plurality of tether members disposed between a front panel directed forward of the vehicle and a rear panel facing the front panel and configured to be directed to the driver to limit an expansion thickness of the driver airbag, and a diffuser configured to control a supply direction of the gas supplied to the driver airbag, and
the diffuser is installed between and directly coupled to the plurality of tether members, wherein the diffuser is spaced apart from and indirectly coupled with the front panel, and wherein the diffuser comprises a plurality of protrusions protruding outward from a body portion of the diffuser, wherein the body portion of the diffuser is solid.

* * * * *